Aug. 25, 1931.  J. L. WILSON  1,820,857
FILLER STRIP FOR DROP CENTER WHEEL RIMS
Filed Aug. 16, 1929
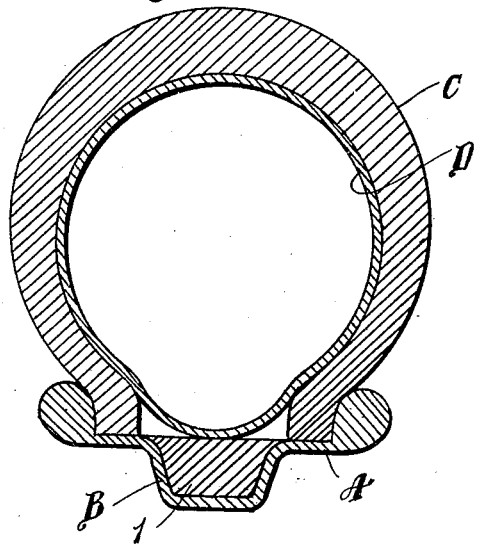
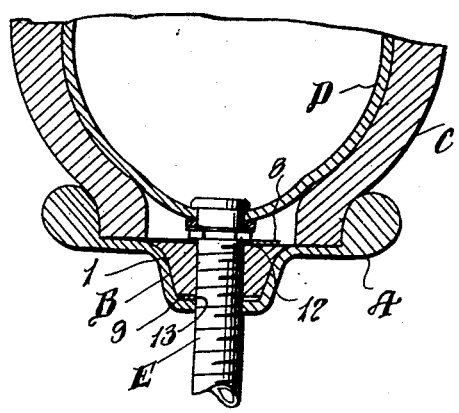
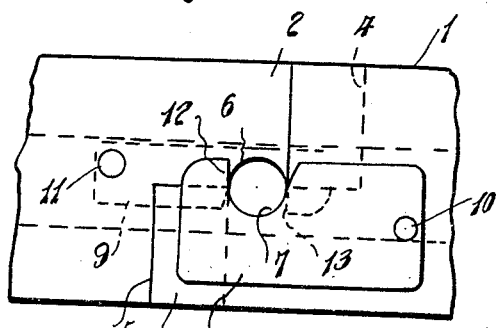
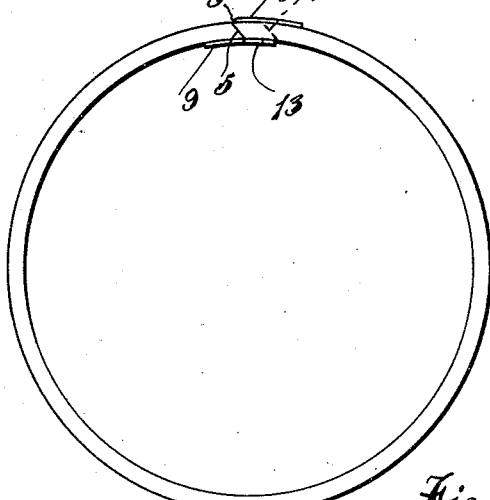
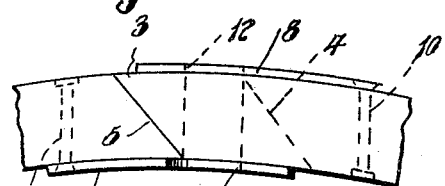
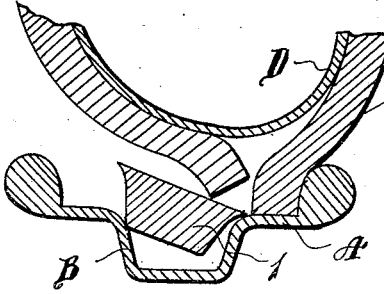
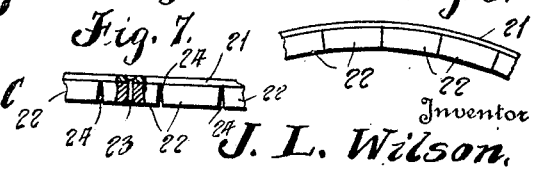
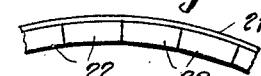
Inventor
J. L. Wilson.
By L. F. Randolph Jr.
Attorney Patented Aug. 25, 1931

1,820,857

UNITED STATES PATENT OFFICE

JOHN L. WILSON, OF WISNER, LOUISIANA

FILLER STRIP FOR DROP CENTER WHEEL RIMS

Application filed August 16, 1929. Serial No. 386,262.

The invention relates to a means for filling the circumferential recess provided in drop center wheel rims to prevent damage to the tire in event of deflation by one of the edges of the casing entering the circumferential recess, and also preventing running the tire off of the rim under such condition.

The invention has for a further object the provision of a strip shaped to snugly fit the circumferential recess in a wheel rim to fill said recess while the tire is in position on the rim, and providing means engaging the valve stem of the inner tube of the tire to hold the ends of the strip together while in position and to prevent the strip from creeping on the tire.

A further object of the invention is the provision of a strip for filling the circumferential recess in a drop center rim to enable the use of a liner for the inner tube, or in the absence of a liner to prevent the inner tube from engaging with the surface of the rim and becoming abraded or otherwise impaired by the rust of the rim.

The invention will be described in detail hereinafter and will be found illustrated in the accompanying drawings in which Figure 1 is a transverse sectional view of a drop center automobile wheel rim showing a tire in position thereon and the filler strip applied thereto, Figure 2 is a fragmentary transverse sectional view taken through the tire and rim in the position assumed by the valve stem, Figure 3 is a side view in elevation of the filler strip showing it in the position when assembled, Figure 4 a plan view of a fragment of the filler strip showing its joint construction and latching means for holding it assembled, Figure 5 is a side view of the part shown in Figure 4, Figure 6 is a fragmentary transverse sectional view showing the position of the deflated tire when removing or replacing the filler strip, Figure 7 is a fragmentary side elevation, partly in section of a modified construction of filler strip, and Figure 8 is a similar view showing the strip of Figure 7 in the position assumed in the drop center.

In the drawings similar reference characters are used to designate corresponding parts throughout the several views.

As heretofore stated the purpose of the invention is to provide means for filling the circumferential recess of a drop center wheel rim, and in the drawings the wheel rim is designated A and the drop center B. C indicates the casing of a pneumatic tire applied to the rim A, D an inner tube and E the valve stem for the inner tube. The invention consists in the provision of a filling strip for the circumferential recess B, for the purpose hereinbefore stated, and the strip is designated 1 and is made of flexible material, preferably cord or fabric treated with rubber, and shaped or fashioned to snugly fit the recess or channel B and to so fill it as to prevent the edges of the casing, when the tire is deflated for any reason, entering the channel and thereby risking damaging the tire or displacement of the tire from the rim. The strip 1 is preferably made annular in contour and has its meeting edges provided with offset portions 2 and 3 and the abutting edges of said offset portions 2 and 3 with the meeting portion of the strip inclined as shown at 4 and 5, respectively. The abutting sides of the offset portions 2 and 3 are provided with semi-circular recesses 6 and 7, respectively, and when the ends of the strip are joined provide an opening for the valve stem E. The meeting ends of the strip are furthermore strengthened and held together by means of latches 8 and 9 on the outer and inner sides of the strip respectively, said latches being pivotally secured to the strip by means of rivets or other members 10 and 11 respectively. Latches 8 and 9 are provided with recesses 12 and 13 that engage the valve stem E when in position the openings of said recesses or notches being in opposite edges of said latches so as to securely hold the ends of the strip connected, said latches serving to prevent circumferential movement of the strip relative to the rim A.

In installing the strip the tire and inner tube is first placed in position on the rim with the stem engaging through the usual opening in the rim therefor, the tube being partly inflated to prevent it from falling into the recess B. One of the walls of the casing is then forced towards the other wall of the casing to expose the circumferential recess, the pressed in wall of the casing adjacent to the valve stem being also forced away from the rim. The strip is then inserted in the recess B under the inner edge of the pressed in wall of the casing C, as shown in Figure 6. The notch 6 is first engaged with the stem E and the latch 9 moved so that the notch or recess 13 engages the stem. The notch 7 is then engaged with the stem E and latch 8 moved to engage the notch 12 with the stem. The pressed in wall of the tire is then released and the tire is ready for inflation. When removing the strip and changing the tire the operation described is reversed after pressing in the casing wall as heretofore described.

It will be furthermore understood that the filler strip prevents injury to the inner tube when the tire is deflated by preventing the casing from creeping on the rim and the casing beads from running down into the drop center.

In Figures 7 and 8 are shown a modified construction of filler strip that consists of a band 21 of any suitable flexible material, such for instance as canvas or other suitable material, to which are secured blocks 22 of wood or other suitable material and that are secured to the band by countersunk rivets 23 or other fastening members. The adjacent edges of the blocks 22 are bevelled slightly as shown at 24 so as to permit bending the filler strip into arcuate form to fit into the drop center, heretofore referred to, the bent form of the strip being shown in Figure 8.

What is claimed is:—

1. A means for filling the drop centers of wheel rims, comprising a strip shaped to fill the circumferential recess in a wheel rim, said strip having overlapping ends adapted to receive the valve stem of an inner tube, and means pivotally engaging said ends and adapted to secure said strip ends to said valve stem.

2. A means for filling the drop centers of wheel rims, comprising a strip of flexible material shaped to fill the circumferential recess in a wheel rim, the ends of said strip being overlapped and provided with mating recesses to receive the valve stem of an inner tube, and latch means pivotally secured to the ends of said strip and engageable with said valve stem to hold the strip in assembled position.

3. A means for filling the drop centers of wheel rims, comprising a strip of flexible material shaped to fill the circumferential recess in a drop center wheel rim, the ends of said strip being provided with offset lap joint members and recessed to receive an inner tube valve stem, and latch means on the two ends of the strip to engage said valve stem.

4. A means for filling the drop centers of wheel rims, comprising a strip of flexible material shaped to fill the circumferential recess in a drop center wheel rim, the ends of said strip being provided with offset lap joint members and recessed to receive an inner tube valve stem, and a latch hook pivotally secured to each end of the strip and on opposite sides thereof to engage the valve stem to prevent creeping of the strip around the rim.

In testimony whereof I affix my signature.

JOHN L. WILSON.